United States Patent
Hayashi et al.

(10) Patent No.: US 8,641,884 B2
(45) Date of Patent: Feb. 4, 2014

(54) MOLD MANUFACTURING METHOD AND ELECTRODE STRUCTURE FOR USE THEREIN

(75) Inventors: Hidekazu Hayashi, Osaka (JP); Tokio Taguchi, Osaka (JP); Kazuhiko Tsuda, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 340 days.

(21) Appl. No.: 13/254,556

(22) PCT Filed: Mar. 2, 2010

(86) PCT No.: PCT/JP2010/001403
§ 371 (c)(1),
(2), (4) Date: Sep. 2, 2011

(87) PCT Pub. No.: WO2010/100894
PCT Pub. Date: Sep. 10, 2010

(65) Prior Publication Data
US 2011/0315557 A1   Dec. 29, 2011

(30) Foreign Application Priority Data
Mar. 5, 2009   (JP) .................................. 2009-052502

(51) Int. Cl.
C25D 11/12   (2006.01)
C25D 11/24   (2006.01)
C25D 17/12   (2006.01)
G02B 1/11   (2006.01)

(52) U.S. Cl.
USPC ...... 205/175; 204/280; 204/290.01; 205/223; 205/229; 205/325

(58) Field of Classification Search
USPC ...................... 205/175, 223, 229; 204/290.01
See application file for complete search history.

(56) References Cited

U.S. PATENT DOCUMENTS 4,089,039 A * 5/1978 Young ............................ 361/322
5,494,713 A * 2/1996 Ootuki .......................... 427/579
(Continued)

FOREIGN PATENT DOCUMENTS

EP   1 643 546 A2   4/2006
JP   2001-517319   10/2001
(Continued)

OTHER PUBLICATIONS

International Preliminary Report on Patentability mailed Oct. 27, 2011 in corresponding PCT Application No. PCT/ JP/2010/001403.
(Continued)

Primary Examiner — Patrick Ryan
Assistant Examiner — William Leader
(74) Attorney, Agent, or Firm — Nixon & Vanderhye, P.C.

(57) ABSTRACT

A method of fabricating a motheye mold according to the present invention includes the steps of: (a) anodizing a surface of an aluminum film (10a) via an electrode (32a) that is in contact with the surface, thereby forming a porous alumina layer which has a plurality of very small recessed portions; (b) after step (a), allowing the porous alumina layer to be in contact with an etchant, thereby enlarging the very small recessed portions of the porous alumina layer; and (c) after step (b), further anodizing the surface to grow the plurality of very small recessed portions. The aluminum film is made of aluminum with a purity of 99.99 mass % or higher. The electrode includes a first electrode portion (32a1) which is made of aluminum with a purity of 99.50 mass % or lower and a second electrode portion (32a2) which is made of aluminum with a higher purity than the aluminum of the first electrode portion and which is interposed between the surface and the first electrode portion. Step (a) and step (c) are performed with the second electrode portion being in contact with the surface in an electrolytic solution. According to the present invention, a method of efficiently anodizing an aluminum film formed over a large surface substrate and an electrode structure for use in the method.

5 Claims, 6 Drawing Sheets

(56) References Cited

U.S. PATENT DOCUMENTS

| | | | |
|---|---|---|---|
| 6,359,735 B1 | 3/2002 | Gombert et al. | |
| 7,048,841 B2 * | 5/2006 | Batz et al. | 205/221 |
| 7,066,234 B2 | 6/2006 | Sawitowski | |
| 7,835,080 B2 | 11/2010 | Taguchi et al. | |
| 2003/0010641 A1 * | 1/2003 | Kholodenko | 205/80 |
| 2003/0121790 A1 | 7/2003 | Hubel | |
| 2004/0140203 A1 * | 7/2004 | Burkhart et al. | 204/297.01 |
| 2004/0256238 A1 * | 12/2004 | Suzuki et al. | 205/118 |
| 2005/0023149 A1 * | 2/2005 | Nakada et al. | 205/137 |
| 2007/0159698 A1 * | 7/2007 | Taguchi et al. | 359/586 |
| 2011/0297640 A1 | 12/2011 | Isurugi et al. | |

FOREIGN PATENT DOCUMENTS

| | | |
|---|---|---|
| JP | 2003-531962 | 10/2003 |
| JP | 2005-156695 | 6/2005 |
| WO | WO 2006/059686 | 6/2006 |
| WO | WO 2010/095415 | 8/2010 |

OTHER PUBLICATIONS

International Search Report for PCT/JP2010/001403, mailed Jun. 8, 2010.

* cited by examiner

MOLD MANUFACTURING METHOD AND ELECTRODE STRUCTURE FOR USE THEREIN

This application is the U.S. national phase of International Application No. PCT/W2010/001403, filed 2 Mar. 2010, which designated the U.S. and claims priority to JP Application No. 2009-052502, filed 5 Mar. 2009, the entire contents of each of which are hereby incorporated by reference.

TECHNICAL FIELD

The present invention relates to a method of fabricating a mold and an electrode structure for use in the method and, specifically, to a method of fabricating a mold by means of anodization. In this specification, the "mold" includes molds that are for use in various processing methods (stamping and casting), and is sometimes referred to as a stamper. The mold can also be used for printing (including nanoprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$-380 nm to 780 nm). See Patent Documents 1 to 4. The two-dimensional size of a raised portion of an uneven pattern which performs an antireflection function is not less than 10 nm and less than 500 nm.

This method utilizes the principles of a so-called motheye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The motheye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a motheye structure, using an anodized porous alumina layer which is obtained by means of anodization (or "anodic oxidation") of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer fabricated under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The present applicant discloses in Patent Document 4 the technique of forming an antireflection film with the use of an alumina layer in which very small recessed portions have stepped side surfaces.

As described in Patent Documents 1, 2, and 4, by providing an uneven structure (macro structure) which is greater than a motheye structure (micro structure) in addition to the motheye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing such an anodized porous aluminum film can facilitate the fabrication of a mold which is used for formation of a motheye structure over a surface (hereinafter, "motheye mold"). In particular, as described in Patent Documents 2 and 4, when the surface of the anodized aluminum film as formed is used as a mold without any modification, a large effect of reducing the manufacturing cost is achieved. The structure of the surface of a motheye mold which is capable of forming a motheye structure is herein referred to as "inverted motheye structure".

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

The present inventor conducted researches and sometimes encountered a problem that, as a result of anodization of an aluminum film that was formed over a large surface substrate using a thin film deposition technique, the aluminum film was partially lost. As will be described later, it was found that this problem is attributed to, for example, the structure of the electrode.

The present invention was conceived in order to solve the above problems. The major objects of the present invention include providing a method of efficiently anodizing an aluminum film formed over a large surface substrate and providing an electrode structure for use in the method.

Solution to Problem

A mold fabrication method of the present invention is a method of fabricating a mold that has an inverted motheye structure in its surface, the inverted motheye structure having a plurality of recessed portions whose two-dimensional size viewed in a direction normal to the surface is not less than 10 nm and less than 500 nm, the method including the steps of: (a) anodizing a surface of an aluminum film or aluminum base via an electrode that is in contact with the surface, thereby forming a porous alumina layer which has a plurality of very small recessed portions; (b) after step (a), allowing the porous alumina layer to be in contact with an etchant, thereby enlarging the plurality of very small recessed portions of the porous alumina layer; and (c) after step (b), further anodizing the surface via the electrode to grow the plurality of very small recessed portions, wherein the aluminum film or aluminum base is made of aluminum with a purity of 99.99 mass % or higher, the electrode includes a first electrode portion which is made of aluminum with a purity of 99.50 mass % or lower and a second electrode portion which is made of aluminum with a higher purity than the aluminum of the first electrode portion and which is interposed between the surface and the first electrode portion, and step (a) and step (c) are performed with the second electrode portion being in contact with the surface in an electrolytic solution.

In one embodiment, a surface of the second electrode portion which is in contact with the surface has a ten-point average roughness Rz of 4.0 μm or less.

In one embodiment, the first electrode portion has an elevated portion which is in contact with the second electrode portion, and step (a) and step (c) are performed with the elevated portion being protected by a protection member such that the electrolytic solution is prevented from entering a gap between the elevated portion and the second electrode portion.

An electrode structure of the present invention is an electrode structure for use in any of the above-described mold fabrication methods, including: the electrode in which the first electrode portion has an elevated portion that is in contact with the second electrode portion; a protection member arranged to surround a perimeter of the elevated portion, the protection member being configured to prevent the electrolytic solution from entering a gap between the elevated portion and the second electrode portion; and a mechanism for pressing the second electrode portion of the electrode against the surface of the aluminum film or aluminum base.

Advantageous Effects of Invention

The present invention provides a method of efficiently anodizing an aluminum film formed over a large surface substrate and an electrode structure for use in the method.

BRIEF DESCRIPTION OF DRAWINGS

FIG. 2 (a) is a schematic cross-sectional view of a motheye mold 90A. (b) shows a cross-sectional SEM image of the motheye mold 90A.
FIG. 6 (a) is a diagram schematically showing a cross-sectional structure of an electrode structure 30A for use in a method of fabricating a motheye mold according to an embodiment of the present invention. (b) is a schematic perspective view showing the relationship between the electrode structure 30A and a sample (aluminum film 10a).
FIG. 7 (a) is a diagram schematically showing a cross-sectional structure of an electrode structure 30B for use in a method of fabricating a motheye mold according to another embodiment of the present invention. (b) is a schematic perspective view showing the relationship between the electrode structure 30B and a sample (aluminum film 10a).

DESCRIPTION OF EMBODIMENTS

Hereinafter, a method of fabricating a motheye mold and an electrode structure for use in the method according to an embodiment of the present invention are described with reference to the drawings. Note that the present invention is not limited to embodiments which will be described below.

First, a method of fabricating a motheye mold, including the process of alternately repeating an anodization step and an etching step, is described with reference to FIGS. 1(a) and 1(b). In the example described herein, an aluminum film is used which has been formed over a base (e.g., glass substrate) using a thin film deposition technique. The embodiment of the present invention is also applicable to a bulk of an aluminum material.

Figure 1:
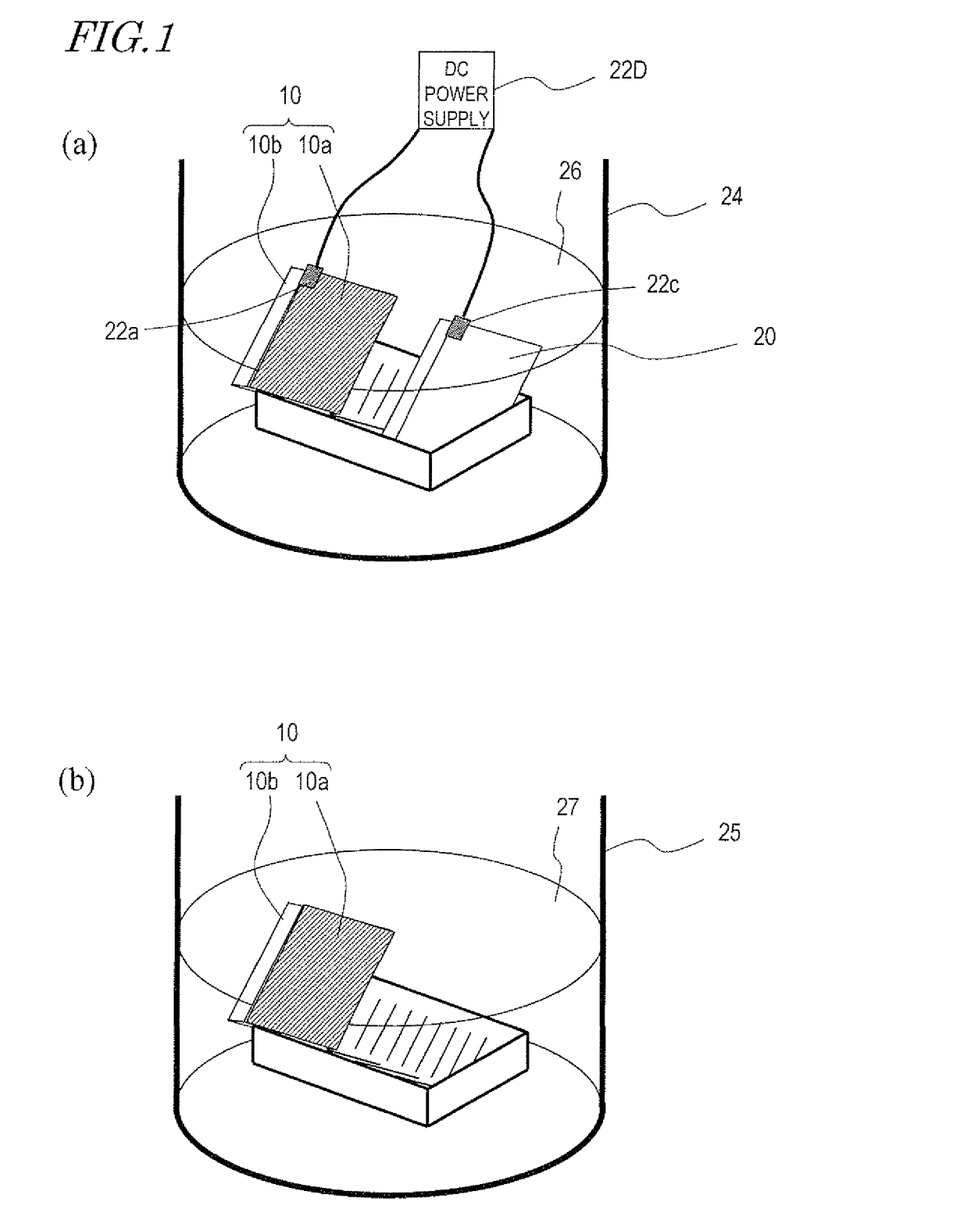
FIG. 1 Diagrams for illustrating the method of fabricating a motheye mold. (a) is a schematic view which illustrates an anodization step. (b) is a schematic view which illustrates an etching step.

FIG. 1(a) is a schematic view illustrating the anodization step in the motheye mold fabrication method. FIG. 1(b) is a schematic view illustrating the etching step.

First, as the base, a sample 10 was provided which was formed by depositing a 1.0 μm thick aluminum film 10a by sputtering over a square glass substrate 10b, each side of which was 5 cm. Note that, here, an aluminum target with a purity of 99.999 mass % (or "5N") or higher was used, and therefore, the obtained aluminum film 10a had a purity of 5N or higher.

Then, as shown in FIG. 1(a), anodization was performed with the sample 10 being held standing in an electrolytic solution 26 in a container 24 with the use of a plastic jig such that a diagonal direction of the sample 10 was coincident with the vertical direction. An electrode 22a that was in contact with the aluminum film 10a was coupled to the positive electrode of an external DC power supply 22D via a lead wire. The negative electrode used in the anodization step was a platinum-plated tantalum plate 20 which had approximately the same size as the sample 10. An electrode 22c that was in contact with the tantalum plate 20 was coupled to the negative electrode of the external DC power supply 22D via another lead wire. The electrolytic solution 26 used herein was a 0.6 mass % oxalic aqueous solution at 5° C. The anodization was performed with an applied voltage at 80 V for 25 seconds.

Thereafter, as shown in FIG. 1(b), the sample 10 was immersed in an etchant 27 (here, a 1 mol/L (liter) phosphoric aqueous solution) at 30° C. in a container 25 for 25 minutes, whereby the porous alumina layer obtained by the anodization was etched. This etching enlarged very small recessed portions of the porous alumina layer. The above-described anodization step and etching step were alternately performed through 5 cycles (including 5 cycles of the anodization step and 4 cycles of the etching step).

Figure 2:
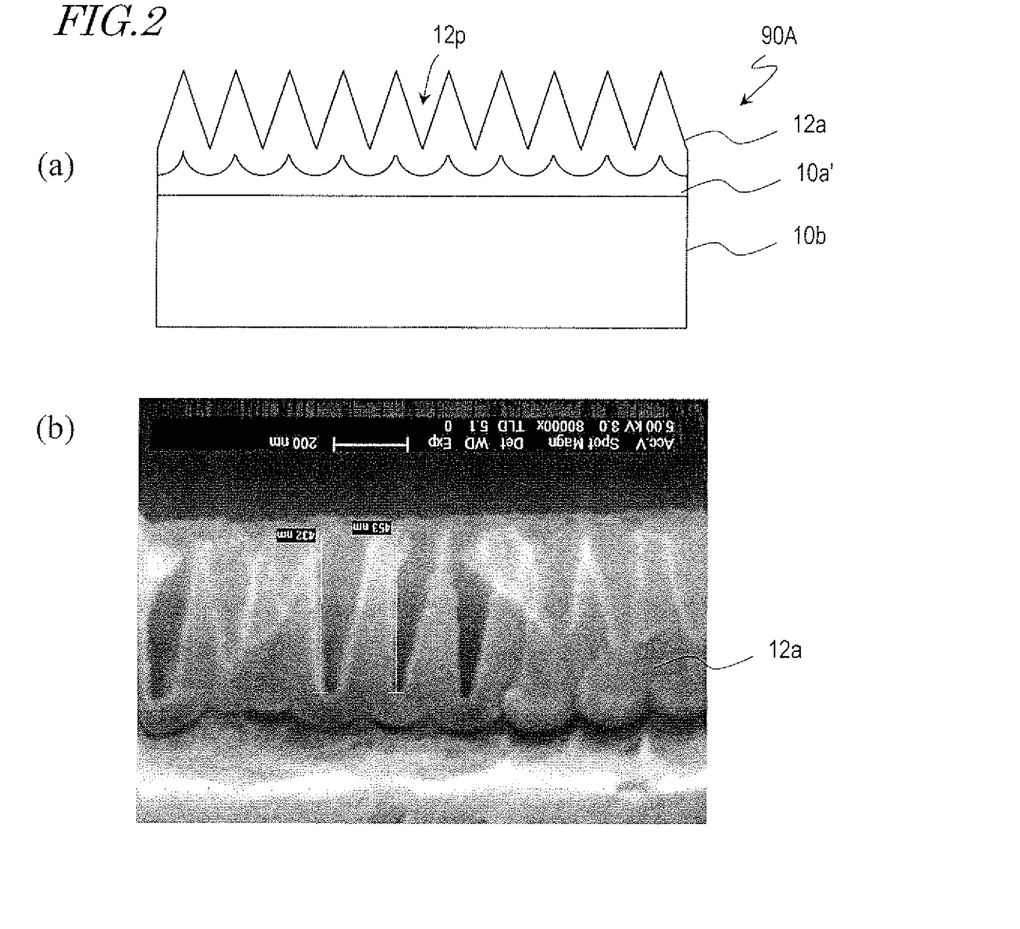

FIG. 2(a) shows a schematic cross-sectional view of the obtained motheye mold 90A. FIG. 2(b) shows a cross-sectional SEM image of the motheye mold 90A.

As seen from FIGS. 2(a) and 2(b), in the motheye mold 90A, a porous alumina layer 12a that has a plurality of very small recessed portions 12p is provided over the glass substrate 10b. Note that the aluminum film 10a is not completely anodized so that there is a remaining aluminum layer 10a' (residual aluminum layer 10a') between the porous alumina layer 12a and the glass substrate 10b.

To form an antireflection film which has an excellent antireflection characteristic, the two-dimensional size of the very small recessed portions 12p of the mold when viewed in a direction normal to the surface of the mold is preferably not less than 10 nm and less than 500 nm, and the distance between recessed portions which are adjacent to each other is preferably not less than 30 nm and less than 600 nm (Patent Documents 1, 2, and 4). As for the dimensions of the very small recessed portions 12p of the porous alumina layer 12a which are formed herein, the opening diameter is 100 nm to 200 nm, the depth is 900 nm to 1 μm, and the distance between adjacent recessed portions 12p is 150 nm to 250 nm.

However, the present inventor sometimes encountered a problem that, when this fabrication method was employed in anodization of an aluminum film that has been formed over a large surface substrate using a thin film deposition technique as will be described below, the aluminum film was partially lost.

Hereinafter, a cause of this problem is explained based on the results of the experiment conducted by the present inventor.

As the base, a sample 10 was provided which was formed by depositing a 1 μm thick aluminum film 10a over a 1000 mm×1600 mm glass substrate 10b by sputtering with the use of an aluminum target with a purity of 99.999 mass % (or "5N") or higher.

Figure 3:
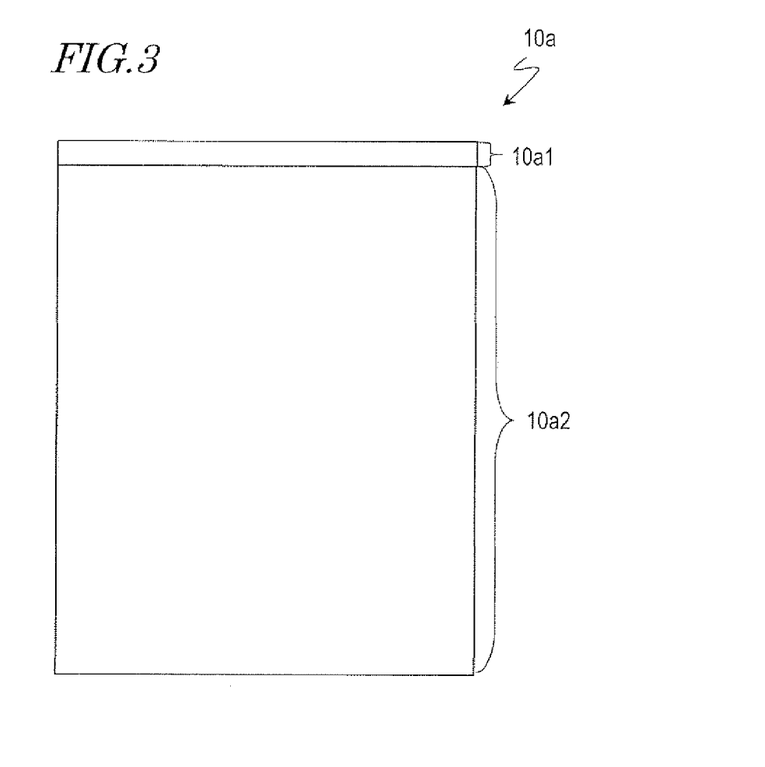
FIG. 3 A schematic view which illustrates the position on an aluminum film at which an electrode is to be placed.

The position on the aluminum film 10a at which the electrode is to be placed is described with reference to FIG. 3. If the thickness of the aluminum film was small so that the surface resistivity was high, and if the contact area of the electrode was small, the aluminum film would sometimes be burned out in the anodization process. In view of such, to obtain a sufficient contact area, the electrode is in contact with an edge region 10a1 that includes one side of the aluminum film 10a as shown in FIG. 3. The area of the region that is to be in contact with the electrode (edge region 10a1) is determined as will be described below based on the results of a preliminary experiment in which anodization of a small aluminum film 10a was performed.

As the preliminary experiment, anodization of the aluminum film 10a formed over the substrate that has an area of 360 mm×465 mm was performed. When the width of the edge region 10a1 was 15 mm, the entire surface of the aluminum film 10a was anodized. In this case, the ratio of the area of the edge region 10a1 to the area of the substrate was about 0.032. The present inventor estimated from the results of the preliminary experiment that, in the anodization of the 1000 mm×1600 mm aluminum film 10a, the area of the edge region 10a1 should be equal to the substrate area multiplied by 0.032, i.e., 51200 mm$^2$ (the width of the edge region 10a1 should be 51.2 mm). In this experiment, with consideration for some margin, the width of the edge region 10a1 was 60 mm. That is, the anodization was performed with the edge region 10a1 being 60000 mm$^2$ in area.

The electrode material used was aluminum of JIS 1050 (aluminum purity: 99.50 mass % or higher). The JIS 1050 material has such hardness that the material is easily machinable. The JIS 1050 material also has a strength which is suitable for use as the electrode. Also, the JIS 1050 material is advantageously inexpensive.

To anodize the entire surface of the aluminum film 10a, the entirety of the aluminum film 10a, including a region which was to be in contact with the electrode (edge region 10a1), was immersed in an electrolytic solution in preparation for anodization.

As a result of the anodization, the aluminum film 10a in the vicinity of the electrode was partially lost as will be described below.

Figure 4:
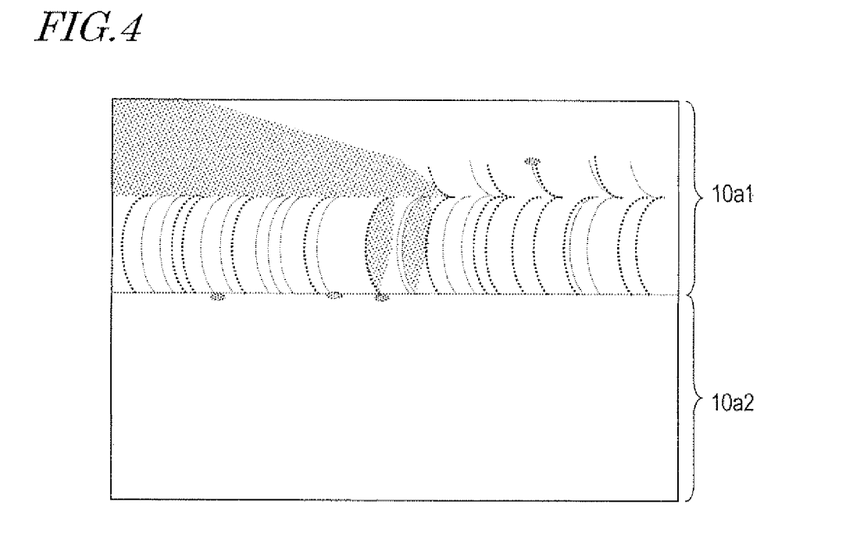
FIG. 4 A schematic view which illustrates the portions at which the aluminum film was lost.

FIG. 4 schematically shows part of the anodized sample 10 in the vicinity of the boundary between the edge region 10a1 and a remaining region 10a2 other than the edge region 10a1 (mold surface formation region 10a2). As shown in FIG. 4, in the region that is to be in contact with the electrode (edge region 10a1), some lost portions were found in the aluminum film 10a. The shape of the lost portions of the aluminum film 10a had a pattern of a plurality of circular arcs. In the mold surface formation region 10a2, a porous alumina layer was formed.

Figure 5:
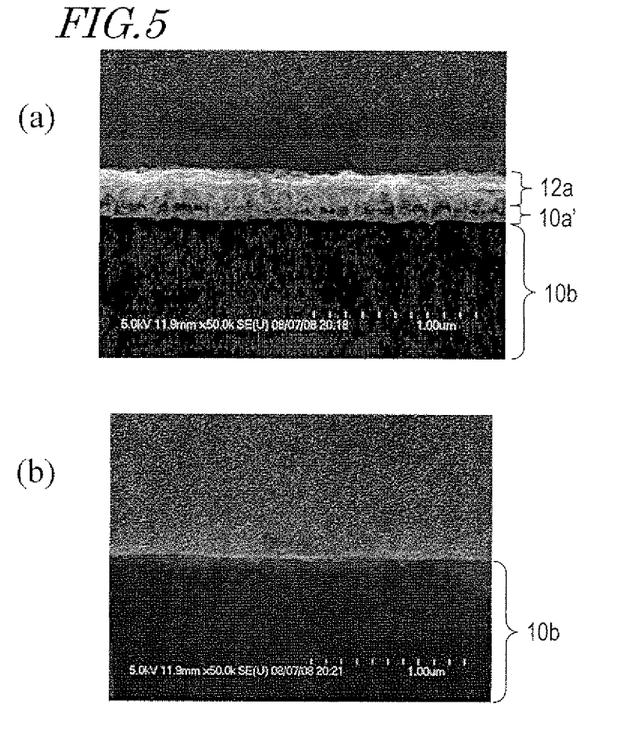
FIG. 5 Cross-sectional SEM images of a sample. (a) shows a cross-sectional SEM image of a mold surface formation region. (b) shows a cross-sectional SEM image of an edge region.

FIG. 5(a) shows a cross-sectional SEM image of part of the mold surface formation region 10a2. FIG. 5(b) shows a cross-sectional SEM image of part of the edge region 10a1. FIG. 5(a) shows a cross section of part of the mold surface formation region 10a2 in the vicinity of the edge region 10a1. In this part, there is a porous alumina layer 12a which has a thickness of about 200 nm over the glass substrate 10b. Note that the aluminum film 10a was not completely anodized, so that there is a remaining aluminum layer 10a' having a thickness of about 100 nm residual aluminum layer 10a') between the porous alumina layer 12a and the glass substrate 10b. FIG. 5(b) shows a cross section of part of the edge region 10a1 from which the aluminum film 10a was lost. In this part, there is only the glass substrate 10b.

The reason why the aluminum film 10a was partially lost is described below.

The shape of the lost portions of the aluminum film 10a had a pattern of a plurality of circular arcs as shown in FIG. 4. The above-described electrode was processed by machining, and the shape of the lost portions was found to be very similar to the scars caused by machining in the electrode surface. It is thus inferred from this that the aluminum film 10a was lost due to the physical damage inflicted by the scars caused by machining in the electrode surface.

The surface of the electrode was a machined surface and therefore had greater surface roughness and greater unevenness in the surface than the aluminum film 10a. Therefore, the edge region 10a1 included portions at which the aluminum film 10a was in contact with the electrode and portions at which the aluminum film 10a was not in contact with the electrode. As a result, it is inferred that, a larger electric current locally flowed through the portions at which the aluminum film 10a was in contact with the electrode to generate heat, and the heat melted away the aluminum film 10a.

Here, there is another possible inference. The electrolytic solution entered portions of the edge region 10a1 which were not in contact with the electrode, and anodization of the aluminum film 10a occurred in and around the portions that the electrolytic solution entered. As a result, a larger electric current flowed through the portions which were in contact with the electrode, so that the loss of the aluminum film 10a was enhanced.

If the anodized portions increase in the edge region 10a1, it becomes difficult to make the potential of the aluminum film 10a uniform. In this case, it is inferred that, there is another problem that it becomes difficult to uniformly anodize the entirety of the aluminum film 10a.

Also, the aluminum film 10a was partially lost in part of the mold surface formation region 10a2 in the vicinity of the edge region 10a1. In the mold surface formation region 10a2, the thickness of the residual aluminum layer 10a' is estimated to be about 700 nm to 800 nm. However, as described above, in part of the mold surface formation region 10a2 in the vicinity of the edge region 10a1, the thickness of the residual aluminum layer 10a' was about 100 nm (FIG. 5(a)). It is inferred that, in part of the mold surface formation region 10a2 in the vicinity of the edge region 10a1, the aluminum film 10a was partially melted away due to the above-described heat generation.

According to a fabrication method which will be described below, loss of the aluminum film 10a is prevented in anodization of the large surface aluminum film 10a.

An electrode structure 30A which is for use in fabrication of a motheye mold of an embodiment of the present invention is described with reference to FIGS. 6(a) and 6(b). FIG. 6(a) schematically shows a cross-sectional structure of the electrode structure 30A. FIG. 6(b) is a schematic perspective view which illustrates the relationship between the electrode structure 30A and the sample (aluminum film 10a).

The electrode structure 30A includes, as shown in FIG. 6(a), an electrode 32a and a mechanism of pressing the electrode 32a against the surface of the aluminum film 10a of the sample 10. The electrode 32a includes a first electrode portion 32a1 and a second electrode portion 32a2. The second electrode portion 32a2 is provided on a side of the first electrode portion 32a1 such that the second electrode portion 32a2 is to come into contact with the aluminum film 10a. Specifically, the second electrode portion 32a2 is interposed between the surface of the aluminum film 10a and the first electrode portion 32a1. The first electrode portion 32a1 may be made of aluminum with a purity of 99.50 mass % or lower. The second electrode portion 32a2 may be made of aluminum with a purity higher than 99.50 mass %. The electrode structure 30A is arranged at the upper edge of the sample 10 such that the second electrode portion 32a2 is in contact with the surface of the aluminum film 10a as shown in FIG. 6(b). An article to be treated (sample 10) includes a glass substrate 10b and an aluminum film 10a which is formed of aluminum with a purity of 99.99 mass % or higher over the glass substrate 10b.

The mechanism of pressing the second electrode portion 32a2 of the electrode 32a against the aluminum film 10a includes a jig 42 which is to come into contact with the substrate 10b of the sample 10, an externally threaded screw 44 which is to be screwed into an threaded hole (internally threaded hole) 42a of the jig 42, and an elastic member 48. The externally threaded screw 44 is passed through a hole in the first electrode portion 32a1 of the electrode 32a and secured to the threaded hole 42a. As shown in FIG. 6(a), the elastic member 48 is provided on part of the jig 42 which is to come into contact with the substrate 10b. When the externally threaded screw 44 pulls the jig 42 toward the electrode 32a, a force is applied to the substrate 10b with the fulcrum being located at the threaded hole 42a. The elastic member 48 reduces the force applied from the jig 42 to the substrate 10b.

The second electrode portion 32a2 may be made of soft aluminum with a high purity (99.50 mass % or higher) so that the tightness between the electrode 32a and the aluminum film 10a can be improved. As the tightness between the electrode 32a and the aluminum film 10a increases, portions of the above-described edge region 10a1 at which the electrode 32a and the aluminum film 10a are not in contact with each other decreases. Therefore, a local flow of a large electric current through the aluminum film 10a is prevented. For example, even when the anodization is performed with the entirety of the aluminum film 10a, including the region which is to be in contact with the electrode, being immersed into an electrolytic solution as in the above-described experiment (in which an electrode made of the JIS 1050 material was brought into contact with the aluminum film 10a), a local flow of a large electric current is prevented. Thus, loss of the aluminum film 10a which would occur due to the heat generated by a local flow of a large electric current can be prevented.

As the portions at which the electrode 32a and the aluminum film 10a are not in contact with each other decrease, entry of the electrolytic solution into the gap between the electrode 32a and the aluminum film 10a is prevented. Therefore, the progress of anodization of the aluminum film 10a is prevented in and around the portions at which the electrode 32a and the aluminum film 10a are not in contact with each other. As a result, occurrence of a local current is prevented in the portions at which the aluminum film 10a and the electrode are in contact with each other, so that loss of the aluminum film can be prevented.

Since high purity aluminum is used for the second electrode portion 32a2, the second electrode portion 32a2 can be formed by rolling. The rolling process can result in smaller surface roughness than a machining process. For example, physical damage to the aluminum film 10a due to the uneven electrode surface which would occur when the electrode is produced by machining can be prevented. Therefore, loss of the aluminum film due to the physical damage can be prevented.

Part of the electrode 32a which is in contact with the aluminum film 10a, i.e., the surface of the second electrode portion 32a2, has decreased surface roughness so that the tightness between the electrode 32a and the aluminum film 10a can advantageously be further increased. In terms of the tightness, the ten-point average roughness Rz of the surface of the second electrode portion 32a2 that is in contact with the surface of the aluminum film 10a is preferably 4.0 µm or less. More preferably, it is 2.0 µm or less.

Since the electrode structure 30A has the second electrode portion 32a2, when the anodization is performed with the use of the electrode structure 30A, loss of the aluminum film 10a can be prevented as described above.

If the entirety of the aluminum film 10a, including a region which is to be in contact with the electrode (edge region 10a1), is immersed in the electrolytic solution in preparation for anodization as in the above-described experiment, loss of the aluminum film may occur. When the anodization is performed with the use of the electrode structure 30A of the embodiment of the present invention, loss of the aluminum film 10a is unlikely to occur even if the entirety of the aluminum film 10a, including a region which is to be in contact with the electrode (edge region 10a1), is immersed in the electrolytic solution. Therefore, as will be described below, for example, the entire surface of the large surface aluminum film 10a can efficiently be anodized.

When the electrode 32a and the aluminum film 10a are brought into contact with each other outside the electrolytic solution, part of the aluminum film 10a outside the electrolytic solution cannot be anodized. Therefore, in order to anodize the large surface aluminum film 10a, it is preferred that the entirety of the aluminum film 10a, including the region which is to be in contact with the electrode (edge region 10a1), is immersed in the electrolytic solution in preparation for anodization.

The electric current density is high at the surface of the electrolytic solution, so that the anodization progresses faster in part of the aluminum film which is in contact with the solution surface than in the other part. Therefore, the part of the aluminum film which is in contact with the solution surface may be insulated. When the aluminum film and the electrode are brought into contact with each other in the electrolytic solution, such insulation at the solution surface would not occur. However, when the entirety of the aluminum film 10a is immersed in the electrolytic solution, the aluminum film 10a may be partially lost as previously described based on the experimental results shown above.

When the electrode structure 30A of the embodiment of the present invention is used, loss of the aluminum film 10a is prevented as described above. Therefore, the anodization can efficiently be performed with the entirety of the large surface aluminum film 10a being immersed in the electrolytic solution.

Since the second electrode portion 32a2 is made of high purity aluminum, the electrode structure 30A has the following advantage. An electrode made of low purity aluminum, such as JIS 1050, includes a portion in which segregation of impurities is found. When the anodization is performed with the electrode made of low purity aluminum being in contact with the aluminum film as in the above-described experiment, there is a probability that an intense current locally will flow through the portion of segregation of impurities to cause the loss of the aluminum film 10a as described above. Since the purity of the second electrode portion 32a2 is high, the electrode structure 30A has an advantage that the amount of impurities is small so that occurrence of a local current due to segregation of impurities can be prevented.

Since the aluminum material of the second electrode portion 32a2 has a high aluminum purity and is therefore soft, a surface of the second electrode portion 32a2 which is in contact with the first electrode portion 32a1 can be deformed in accordance with the shape of a surface of the first electrode portion 32a1 which is in contact with the second electrode portion 32a2. Thus, in the electrode structure 30A, the tightness between the second electrode portion 32a2 and the first electrode portion 32a1 is high. If the tightness between the first electrode portion 32a1 and the second electrode portion 32a2 was poor, the electrolytic solution would enter the gap between these portions so that the second electrode portion 32a2 can be anodized. Since in the electrode structure 30A the tightness between the first electrode portion 32a1 and the second electrode portion 32a2 is high, the electrolytic solution can be prevented from entering the gap between the first electrode portion 32a1 and the second electrode portion 32a2.

Note that the tightness between the electrode 32a and the aluminum film 10a can also be improved even when the electrode 32a is only made of high purity aluminum (for example, aluminum with a purity of 99.99 mass % or higher). However, an aluminum material made of high purity aluminum is difficult to process by machining and is difficult to process into an electrode. Also, the strength of a high purity aluminum material is low. Since the first electrode portion 32a1 of the electrode structure 30A of the present embodiment is made of low purity aluminum which can readily be processed by machining, the first electrode portion 32a1 advantageously has high strength and can readily be processed by machining. The electrode 32a can be made of a small amount of high purity aluminum as compared with a case where the entire electrode is made of high purity aluminum, and therefore, the manufacturing cost of the electrode 32a can advantageously be reduced although high purity aluminum is expensive.

If the electrode was made of a different material from aluminum, an electrolytic reaction would occur in the anodization step so that the aluminum film 10a would be partially dissolved. However, since aluminum is used as material for the electrode 32a, advantageously, the aluminum film 10a would not undergo dissolution due to such an electrolytic reaction.

Also, the electrode structure 30A has another advantage, which will be described later, that a defect would not be produced even if the etching step is performed with the electrode 32a being in contact with the aluminum film 10a.

When the anodization step and the etching step are repeated, the etching is preferably performed without detaching the electrode that has been in contact with the aluminum film 10a during the anodization step. In the above-described experiment (in which an electrode made of the JIS 1050 material was brought into contact with the aluminum film 10a), the etching was performed with the electrode being kept in contact with the aluminum film 10a after the anodization step, resulting in production of a defect in the anodized porous alumina film in the mold surface formation region 10a2, such as a hole which was larger than the recessed portion of the inverted motheye structure (having a two-dimensional size not less than 10 nm and less than 500 nm). This may be attributed to production of a cell effect via the etchant, which occurred because the aluminum film 10a was exposed to the etchant while the aluminum film 10a was in contact with the JIS 1050 material in which a large amount of impurities were contained. Also, in the edge region 10a1, as the number of cycles of the anodization and the etching increased, the loss of the aluminum film 10a was found in an increased number of locations. It is inferred that the etchant entered portions of the edge region 10a1 in which the aluminum film 10a was not in contact with the electrode, so that a local cell was formed via the etchant in the vicinity of the impurities contained in the electrode, resulting in the loss of the aluminum film 10a.

In the electrode structure 30A, the second electrode portion 32a2 that is to be brought into contact with the aluminum film 10a has higher purity and therefore contains a smaller amount of impurities. Therefore, the electrode structure 30A is unlikely to undergo the above-described cell effect via the etchant even when the etching is performed without detaching the electrode 32a. Therefore, the electrode structure 30A is unlikely to have the above-described defect even when the anodization step and the etching step are repeatedly performed (see Japanese Patent Application No. 2009-034148). The entire disclosures of Japanese Patent Application No. 2009-034148 are incorporated by reference in this specification.

In the electrode structure 30A, the etchant is prevented from entering the portions at which the aluminum film 10a and the electrode 32a are not in contact with each other because the tightness between the electrode 32a and the aluminum film 10a is high. So long as the entry of the etchant is prevented, formation of the above-described local cell is prevented even after repetition of the anodization and the etching. Thus, in the electrode structure 30A, loss of the aluminum film 10a can be prevented.

The first electrode portion 32a1 is made of low purity aluminum (99.50 mass % or lower) while the second electrode portion 32a2 is made of high purity aluminum (higher than 99.50 mass %). Therefore, when the etching is performed with the electrode 32a used in the anodization step being kept in contact with the aluminum film 10a, the etchant may enter the gap between the first electrode portion 32a1 and the second electrode portion 32a2 and cause corrosion of the second electrode portion 32a2. As described above, in the electrode structure 30A, the tightness between the first electrode portion 32a1 and the second electrode portion 32a2 is high so that entry of the etchant into the gap between the first electrode portion 32a1 and the second electrode portion 32a2 can be prevented. Therefore, corrosion of the second electrode portion 32a2 in the etching step can be prevented.

Assume, for the sake of explanation, that the etchant enters the gap between the first electrode portion 32a1 and the second electrode portion 32a2 and causes corrosion of the second electrode portion 32a2. Even in such a case, the electrode 32a can be repaired only by replacing the second electrode portion 32a2. Thus, the cost is advantageously small as compared with a case where the entire electrode 32a is replaced.

Examples of the material for the first electrode portion 32a1 include Al—Mg alloy materials (e.g., JIS 5052) and Al—Mg—Si alloy materials (e.g., JIS 6063). Examples of the material for the second electrode portion 32a2 include aluminum with a purity of 99.85 mass % or higher (e.g., JIS 1085) and aluminum with a purity of 99.99 mass % or higher (or "4N").

The substrate 10b of the sample 10 is preferably an insulator which has acid resistance. Examples of the material for the substrate 10b include glass, ceramic materials, such as sintered alumite, and resin materials, such as polycarbonate, POM (polyacetal), PTFE (polytetrafluoroethylene (e.g., Teflon (registered mark)), PEEK (polyethylene ether ketone), etc. The aluminum film 10a may be formed of 4N or 5N aluminum by a vapor deposition method, such as sputtering, EB deposition, ion plating, or the like. The aluminum film 10a may alternatively be formed by a coating method, such as hot dipping, or the like.

The jig 42 may be made of, for example, POM. The externally threaded screw 44 may be made of, for example, PEEK. The elastic member 48 is preferably made of a material which has acid resistance, for example, silicone fluorocarbon rubber, rubber of PTFE (e.g., Teflon (registered mark)), or the like.

Figure 7:
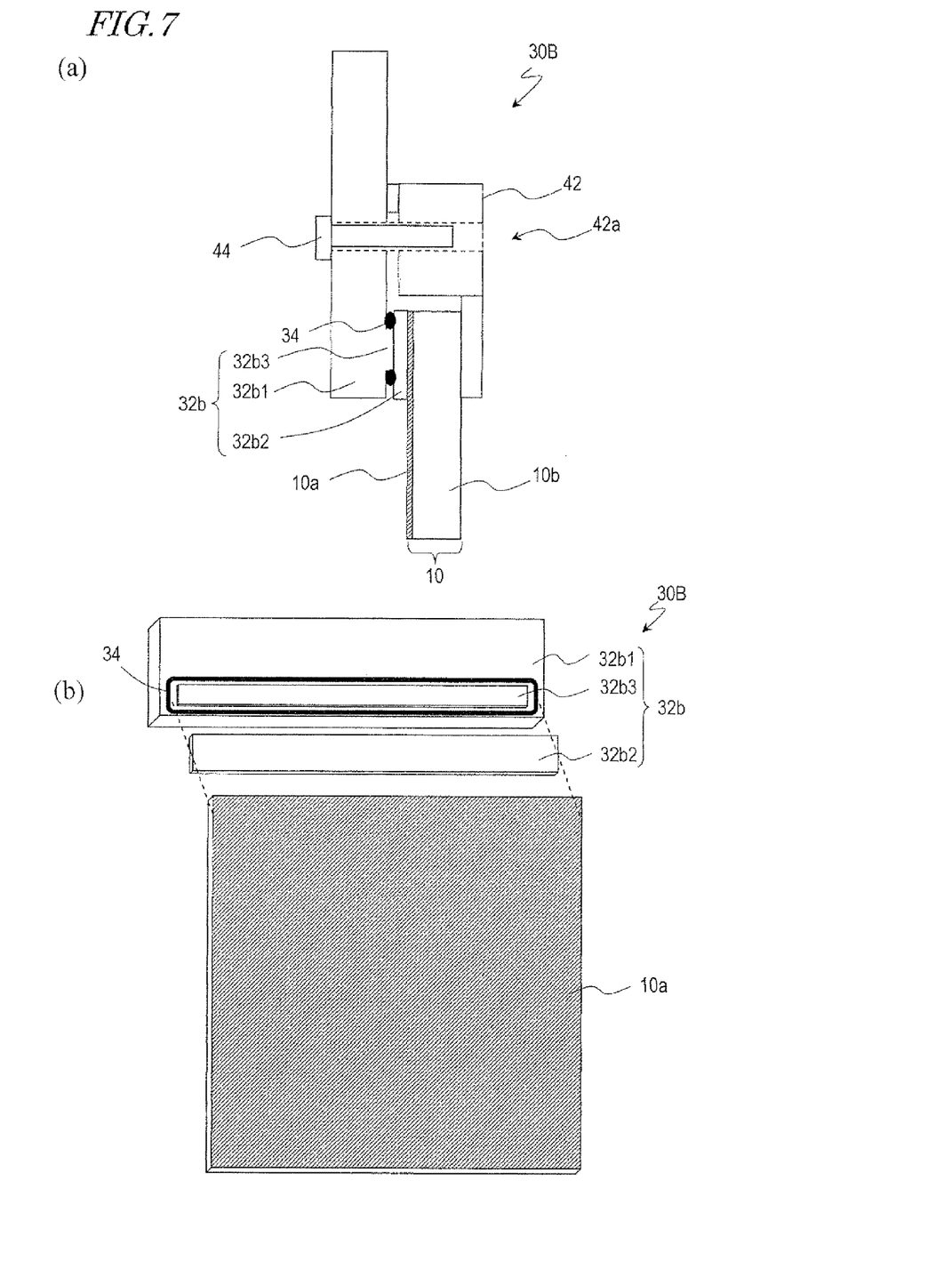

FIG. 7(a) schematically shows a cross-sectional structure of an electrode structure 30B for use in the method of fabricating a motheye mold according to another embodiment of the present invention. FIG. 7(b) is a schematic perspective view illustrating the relationship between the electrode structure 30B and a sample (aluminum film 10a).

The electrode structure 30B includes an electrode 32b and a mechanism of pressing the electrode 32b against the surface of the aluminum film 10a of the sample 10. The electrode 32b includes a first electrode portion 32b1 and a second electrode portion 32b2. The first electrode portion 32b1 has an elevated portion 32b3 which is to be in contact with the second electrode portion 32b2. The first electrode portion 32b1 is arranged such that the elevated portion 32b3 comes into contact with the surface of the second electrode portion 32b2 as shown in FIG. 7(b). The materials of the first electrode portion 32b1 and the second electrode portion 32b2 may be the same as the above-described materials of the first electrode portion 32a1 and the second electrode portion 32a2, respectively, of the electrode structure 30A.

The electrode structure 30B further includes a protection member 34 which is arranged to surround the perimeter of the elevated portion 32b3 and which is configured to prevent the electrolytic solution from entering the gap between the elevated portion 32b3 and the second electrode portion 32b2. The protection member 34 is made of a resilient material which is capable of elastic deformation (e.g., rubber). The protection member 34 may be, for example, an O-ring. The protection member 34 has such hardness that the protection member 34 is deformed when the first electrode portion 32b1 is relatively pressed against the second electrode portion 32b2. After the protection member 34 is placed around the perimeter of the elevated portion 32b3, the sample 10 and the electrode 32b are bound together by the jig 42, whereby the protection member 34 is deformed. By using this mechanism, the gap between the first electrode portion 32b1 and the second electrode portion 32b2 can be suitably tightly sealed.

Figure 6:
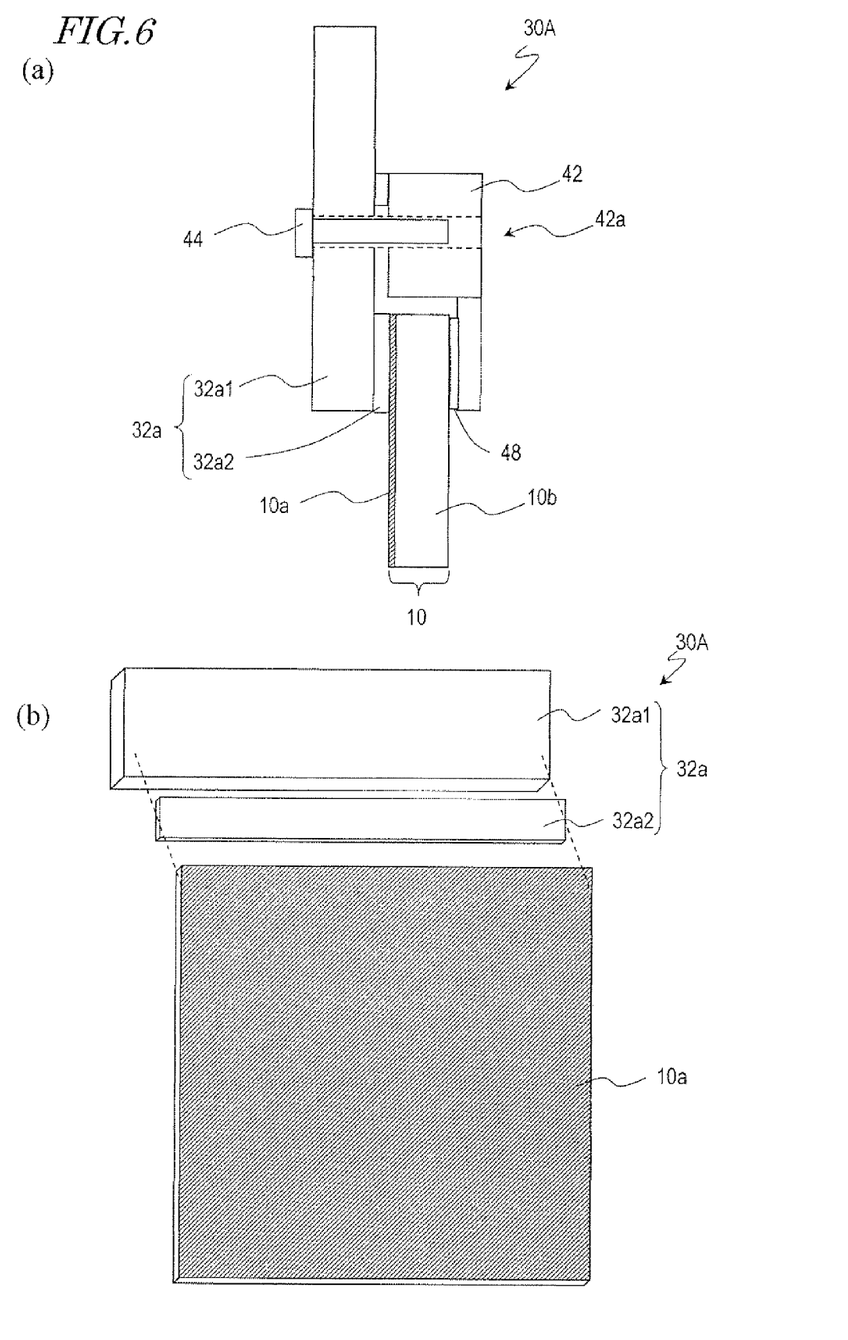

Since the electrode structure 30B includes the second electrode portion 32b2 that is made of high purity aluminum (99.50 mass % or higher), loss of the aluminum film 10a in the anodization step can be prevented as in the electrode structure 30A (FIG. 6). Also, since the electrode structure 30B includes the protection member 34, the electrolytic solution can be prevented from entering the gap between the first electrode portion 32a1 and the second electrode portion 32a2.

In the electrode structure 30B, aluminum used as the material for the second electrode portion 32b2 that is to be in contact with the aluminum film 10a has high aluminum purity and therefore contains a small amount of impurities, as in the electrode structure 30A. Also, the tightness between the second electrode portion 32b2 and the aluminum film 10a is high. Therefore, formation of a local cell in the etching step is prevented. Thus, even when the etching step is performed without detaching the electrode 32b, production of a defect due to the above-described local cell can advantageously be prevented. Note that, since the electrode structure 30B includes the protection member 34, the etchant can advantageously be prevented from entering the gap between the first electrode portion 32b1 and the second electrode portion 32b2 as compared with the electrode structure 30A.

INDUSTRIAL APPLICABILITY

The present invention is widely applicable to the method of fabricating a motheye mold. A mold which is fabricated based on the fabrication method of the present invention is widely applicable to formation of a surface in which nanometer-scale unevenness is demanded, typically such as formation of an antireflection film.

REFERENCE SIGNS LIST

10 sample
10a aluminum film
10a' residual aluminum layer
10b substrate (glass substrate)
12a porous alumina layer
12p recessed portion
24 container
26 electrolytic solution
27 etchant
30A, 30B electrode structure
32a, 32b electrode
32a1, 32b1 first electrode portion
32a2, 32b2 second electrode portion
32b3 elevated portion
34 protection member
42 jig
42a threaded hole (internally threaded hole)
44 externally threaded screw
48 elastic member
90A motheye mold

The invention claimed is:

1. A method of fabricating a mold that has an inverted motheye structure in its surface, the inverted motheye structure having a plurality of recessed portions whose two-dimensional size viewed in a direction normal to the surface is not less than 10 nm and less than 500 nm, the method comprising the steps of:
 (a) anodizing a surface of an aluminum film or aluminum base via an electrode that is in contact with the surface, thereby forming a porous alumina layer which has a plurality of very small recessed portions;
 (b) after step (a), allowing the porous alumina layer to be in contact with an etchant, thereby enlarging the plurality of very small recessed portions of the porous alumina layer; and
 (c) after step (b), further anodizing the surface via the electrode to grow the plurality of very small recessed portions,
 wherein the aluminum film or aluminum base is made of aluminum with a purity of 99.99 mass % or higher,
 the electrode includes a first electrode portion which is made of aluminum with a purity of 99.50 mass % or lower and a second electrode portion which is made of aluminum with a higher purity than the aluminum of the first electrode portion and which is interposed between the surface and the first electrode portion, and
 step (a) and step (c) are performed with the second electrode portion being in contact with the surface in an electrolytic solution.

2. The method of claim 1, wherein a surface of the second electrode portion which is in contact with the surface has a ten-point average roughness Rz of 4.0 μm or less.

3. The method of claim 1, wherein
 the first electrode portion has an elevated portion which is in contact with the second electrode portion, and
 step (a) and step (c) are performed with the elevated portion being protected by a protection member such that the electrolytic solution is prevented from entering a gap between the elevated portion and the second electrode portion.

4. An electrode structure for use in a method of fabricating a mold that has an inverted motheye structure in its surface, the inverted motheye structure having a plurality of recessed portions whose two-dimensional size viewed in a direction normal to the surface is not less than 10 nm and less than 500 nm, the method comprising the steps of:
 (a) anodizing a surface of an aluminum film or aluminum base via an electrode that is in contact with the surface, thereby forming a porous alumina layer which has a plurality of very small recessed portions;
 (b) after step (a), allowing the porous alumina layer to be in contact with an etchant, thereby enlarging the plurality of very small recessed portions of the porous alumina layer; and
 (c) after step (b), further anodizing the surface via the electrode to grow the plurality of very small recessed portions,
 wherein the aluminum film or aluminum base is made of aluminum with a purity of 99.99 mass % or higher,
 the electrode structure comprising:
 an electrode comprising a first electrode portion which is made of aluminum with a purity of 99.50 mass % or lower and a second electrode portion which is made of aluminum with a higher purity than the aluminum of the first electrode portion and which is positioned on the first electrode portion so as to be interposed between the first electrode portion and the surface of the aluminum film or aluminum base to be anodized, wherein the first electrode portion has an elevated portion that is in contact with the second electrode portion;
 a protection member arranged to surround a perimeter of the elevated portion, the protection member being configured to prevent the electrolytic solution from entering a gap between the elevated portion and the second electrode portion; and
 a mechanism for pressing the second electrode portion of the electrode against the surface of the aluminum film or aluminum base; and
 wherein step (a) and step (c) are performed with the second electrode portion being in contact with the surface of the aluminum film or aluminum base in an electrolytic solution, the protection member preventing the electrolytic solution from entering a gap between the elevated portion and the second electrode portion.

5. The electrode structure of claim 4, wherein a surface of the second electrode portion which is in contact with the surface has a ten-point average roughness Rz of 4.0 μm or less.

* * * * *